(12) United States Patent
Watanabe

(10) Patent No.: US 6,724,578 B2
(45) Date of Patent: Apr. 20, 2004

(54) ELECTRICAL CONNECTION FOR THE ACTUATOR COIL OF A MAGNETIC DISK DRIVE

(75) Inventor: Masashi Watanabe, Ehime (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 167 days.

(21) Appl. No.: 09/959,335

(22) PCT Filed: Feb. 26, 2001

(86) PCT No.: PCT/JP01/01410

§ 371 (c)(1),
(2), (4) Date: Dec. 4, 2001

(87) PCT Pub. No.: WO01/63610

PCT Pub. Date: Aug. 30, 2001

(65) Prior Publication Data

US 2002/0159196 A1 Oct. 31, 2002

(30) Foreign Application Priority Data

Feb. 25, 2000 (JP) .......................... 2000-50011

(51) Int. Cl.⁷ ................................ G11B 5/55
(52) U.S. Cl. ................................ 360/264.2
(58) Field of Search ............. 360/264.2, 265.8

(56) References Cited

U.S. PATENT DOCUMENTS

| 5,122,703 A | * | 6/1992 | Takahashi | 310/36 |
| 5,734,528 A | * | 3/1998 | Jabbari | 360/265 |
| 5,924,881 A | * | 7/1999 | Yasushi | 439/188 |

FOREIGN PATENT DOCUMENTS

| JP | 3-277160 | 12/1991 |
| JP | 4-236157 | 8/1992 |
| JP | 6-215498 | 8/1994 |
| JP | 7-34638 | 4/1995 |
| JP | 11-353822 | 12/1999 |

* cited by examiner

Primary Examiner—A. J. Heinz
(74) Attorney, Agent, or Firm—Wenderoth, Lind & Ponack, L.L.P.

(57) ABSTRACT

The present invention provides a thin actuator which is used for transferring a head of a magnetic disk drive, and prevents resultant malfunctions. In a moving part of the actuator in which a coil, holding member, housing, and plate-shaped terminals are integrated by resin molding, the plate-shaped terminals are provided in the holding member in a coil moving direction, and the plate-shaped terminals and connecting parts provided in a conductor end part of the flexible circuit board are brought into surface contact, and these contacted portions are electrically connected with solder.

20 Claims, 5 Drawing Sheets

ELECTRICAL CONNECTION FOR THE ACTUATOR COIL OF A MAGNETIC DISK DRIVE

TECHNICAL FIELD

The present invention relates to an actuator which is used for transferring a head of a magnetic disk drive and the like.

BACKGROUND ART

Hereinafter, a conventional actuator will be described with reference to FIGS. 7 to 10.

FIGS. 7 to 10 are diagrams for illustrating structures of a conventional actuator. FIG. 7 is a sectional view illustrating the actuator. FIG. 8 is a perspective view illustrating a moving part of the actuator. FIG. 9 is a sectional view illustrating a metallic mold for forming the moving part of the actuator. And, FIG. 10 is an enlarged view illustrating a terminal section of FIG. 9.

In FIG. 7, numerals 21a and 21b denote opposite yokes which are provided with a predetermined space therebetween; numeral 22 denotes a coil which is movably wound between the yokes 21a and 21b; and numeral 23 denotes a permanent magnet which is attached between the yokes 21a and 21b, and to at least one of the yokes, and applies a magnetic field to the coil 22. The permanent magnet 23 is attached to the yoke 21a in the example shown in FIG. 7, magnetized as shown in this figure, and applies a magnetic flux to the coil 22.

In FIG. 8, numeral 22 denotes the coil which is movably wound between the yokes 21a and 21b, and numeral 25 denotes a holding member made of a thermoplastic resin, which holds the coil 22. Numeral 26 denotes a housing made of metal material such as aluminum alloy and the like. A rotation constraint mechanism can be fitted in a hole 27 provided in the housing 26, and a magnetic head can be fitted in a hole 28 (the rotation constraint mechanism and the magnetic head are not shown in this figure). Numerals 29a and 29b denote terminals to which both end parts of a strand of the coil 22 are electrically connected. Usually, the terminals 29a and 29b are inexpensive, so pin-shaped ones made of conductive material are employed. Numeral 30 denotes a flexible circuit board including a conductor part which transmits a current from a current generation source (not shown) to the coil 22 via the pin-shaped terminals 29a and 29b.

In FIG. 8, the coil 22 is wound in a shape of a trapezoid, and when a current in a clockwise direction is passed through the coil 22, a force is generated in the coil 22 in accordance with Fleming's left hand rule, and the coil 22 moves in a direction of arrow 24. In this case, in FIG. 7, in a part on a right side of the coil 22, a current flows from a far side to a near side, and in a part on a left side of the coil 22, the current flows from a near side to a far side. When a current in a counterclockwise direction is passed through the coil 22, the coil 22 moves in an opposite direction to that of arrow 24. In this case, in FIG. 7, in a part on the right side of the coil 22, a current flows from a near side to a far side, and in a part on the left side of the coil 22, a current flows from a far side to a near side. Here, the coil 22 is set by a stopper (not shown) to move only within a coil movable range.

Next, a production method of the conventional movable part will be described with reference to FIGS. 8 and 9.

In FIG. 9, numerals 31a and 31b denote metallic molds and, for convenience sake, the metallic mold 31b is described as an upper part, but the mold 31b is a lower mold and the mold 31a is an upper mold. Numeral 32 denotes a direction of separation between the metallic molds 31a and 31b.

Initially, coil 22, pin-shaped terminals 29a and 29b (not shown in FIG. 9) to which the coil 22 is connected, and housing 26 are positioned in the metallic molds 31a and 31b, and thermoplastic resin is injected into the metallic molds 31a and 31b, thereby forming holding member 25, and integrating the coil 22, the housing 26, and the pin-shaped terminals 29a and 29b. In FIG. 9, in the metallic molds 31a and 31b, a longitudinal direction of the pin-shaped terminals 29a and 29b is directed in the same direction as the separation direction 32.

Next, flexible circuit board 30 is fixed on the housing 26 by a fastening device such as a screw (not shown). At this time, parts of the pin-shaped terminals 29a and 29b, exposed from the holding member 25, are inserted into holes 30a and 30b provided in a conductor end part of the flexible circuit board 30, and projecting parts of the pin-shaped terminals 29a and 29b and the conductor part are connected electrically with solder.

Next, a structure of a pin-shaped terminal section in the conventional movable part will be described with reference to FIG. 10.

In this figure, one end of the pin-shaped terminal 29a is held by the holding member 25, and another end is exposed from the holding member 25. Coil strand 22c is wound on a part of the pin-shaped terminals 29a, which is buried in the holding member 25, and electrically connected thereto with solder 33a. Further, in a state where the exposed part of the pin-shaped terminal 29a is inserted into the hole 30a provided in the flexible circuit board 30, the exposed part and the conductor part 30c of the flexible circuit board 30 are electrically connected with solder 33b. In addition, the pin-shaped terminal 29b is similarly connected to the coil 22 and the flexible circuit board 30.

According to the above-mentioned construction, the coil is of a flat type and therefore the separation direction 32 is set to be perpendicular to a coil moving direction, for convenience during production in the metallic molds. In addition, it is difficult to arrange a longitudinal direction of the pin-shaped terminals parallel with the coil moving direction, for convenience during production in the metallic molds, and therefore the longitudinal direction of the pin-shaped terminal is directed in the same direction as the separating direction 32.

Therefore, in order to ensure a length of the pin-shaped terminals, which is required for positioning in the metallic mold, a prescribed length is required. Further, because the pin-shaped terminals exposed from the holding member are inserted into the holes in the conductor end part of the flexible circuit board and electrically connected by solder, the exposed parts of the pin-shaped terminals cannot be shortened. In addition, the part of the pin-shaped terminal, which is buried in the holding member, cannot be shortened because the part is wound by the coil strand and electrically connected thereto with the solder.

The longitudinal direction of the pin-shaped terminal formed as described above corresponds to a thickness direction of an apparatus into which the actuator is installed, and in such construction, while thinner apparatus are demanded in recent years, it is very difficult to provide these thinner apparatus.

In addition, as described above, in a state where pin-shaped terminals are inserted into the holes provided in the flexible circuit board, the pin-shaped terminals are covered and connected by solder, and therefore pin-shaped terminal connecting parts on the flexible circuit board become larger. As a result, adjacent permanent magnets or yokes become smaller, which prevents an actuator in its entirety from generating a large torque.

Further, since two pin-shaped terminals have the same shape, when these terminals are positioned in metallic molds, they may be erroneously placed. Accordingly, a direction of current which passes through the coil becomes opposite to a proper direction, which causes a malfunction in that the movable part of the actuator moves in an opposite direction.

The present invention is made to solve the above-described problems, and has for its object to provide an actuator which can thin an apparatus into which the actuator is installed and prevent resultant malfunction.

SUMMARY OF INVENTION

The present invention is made to achieve the above-mentioned object, and in accordance with a first aspect of the invention an actuator comprises: plural yokes which confront each other while providing a predetermined space therebetween; a coil which is wound and movably placed between the plural yokes; a permanent magnet which is located between the plural yokes and attached to at least one of the yokes, and which applies a magnetic field to the coil; a holding member for holding the coil, which holding member is made of a thermoplastic resin; a housing to which the holding member is attached at one end, and to which a functional member can be attached at another end; and a flexible circuit board which transmits a current from an exterior to the coil, wherein portions of two plate-shaped terminals to which opposite end parts of a strand of the coil are electrically connected are buried in the holding member and exposed parts of both plate-shaped terminals are electrically connected to a conductor part of the flexible circuit board.

According to a second aspect of the present invention, in the actuator of the first aspect, the two plate-shaped terminals are buried in a side part of the holding member so that longitudinal directions of the terminals are parallel with a coil movable direction.

According to a third aspect of the present invention, in the actuator of the first aspect, the two plate-shaped terminals are buried in a side part of the holding member so that longitudinal directions of the terminals are parallel with a coil movable direction, and both plate-shaped terminals are provided on a flat surface.

According to a fourth aspect of the present invention, in the actuator of the first aspect, the two plate-shaped terminals are formed by integrally burying two plate-shaped terminals in the holding member, which is made of the thermoplastic resin, via a molding operation, and thereafter separating exposed parts of this integral structure into two pieces.

According to a fifth aspect of the present invention, in the actuator of the first aspect, end parts of the two plate-shaped terminals, which end parts are connected to the coil strand, have different shapes, respectively.

According to a sixth aspect of the present invention, in the actuator of the fifth aspect, one of the end parts of the two plate-shaped terminals, which end parts are connected to the coil strand, is longer than the other.

According to a seventh aspect of the present invention, in the actuator of the fifth aspect, one of the end parts of the two plate-shaped terminals, which end parts are connected to the coil strand, is crank-shaped.

As described above, an actuator according to the first aspect of the present invention comprises: plural yokes which confront each other while providing a predetermined space therebetween; a coil which is wound and movably placed between the plural yokes; a permanent magnet which is located between the plural yokes and attached to at least one of the yokes, and applies a magnetic field to the coil; a holding member for holding the coil, which holding member is made of a thermoplastic resin; a housing to which the holding member is attached at one end, and to which a functional member can be attached at another end; and a flexible circuit board which transmits a current from an exterior to the coil, wherein portions of two plate-shaped terminals to which opposite end parts of a strand of the coil are electrically connected are buried in the holding member, and exposed parts of both plate-shaped terminals are electrically connected to a conductor part of the flexible circuit board. Therefore, both plate-shaped terminals can be placed at arbitrary positions in the holding member, and a movable part of an actuator which consists of the coil, the holding member, the housing, the plate-shaped terminals and the flexible circuit board can be thinner, and consequently, an apparatus into which the actuator of the present invention is installed can be thinner.

According to the second aspect of the present invention, in the actuator as defined in the first aspect, the two plate-shaped terminals are buried in a side part of the holding member so that longitudinal directions of the terminals are parallel with a coil movable direction. Therefore, a movable part of the actuator which consists of the coil, the holding member, the housing, the plate-shaped terminals and the flexible circuit board can be thinner, and consequently an apparatus into which the actuator of the present invention is installed can be thinner.

According to the third aspect of the present invention, in the actuator as defined in the first aspect, the two plate-shaped terminals are buried in a side part of the holding member so that longitudinal directions of the terminals are parallel with a coil movable direction, and both plate-shaped terminals are provided on a flat surface. Therefore, connecting parts of both plate-shaped terminals and the flexible circuit board can be smaller, and a movable part of the actuator which consists of the coil, the holding member, the housing, the plate-shaped terminals and the flexible circuit board can be thinner, and consequently, an apparatus into which the actuator of the present invention is installed can be thinner. Further, due to miniaturization of the connecting parts of the plate-shaped terminals and the flexible circuit board, adjacent yokes or permanent magnets can be enlarged, whereby a large torque can be obtained.

According to the fourth aspect of the present invention, in the actuator as defined in the first aspect, the two plate-shaped terminals are formed by burying portions of two integrally constructed plate-shaped terminals in a holding member which is made by molding thermoplastic resin, and thereafter separating exposed parts of the plate-shaped terminals into two pieces. Therefore, both plate-shaped terminals can be easily formed on the flat surface, and a movable part of the actuator which consists of the coil, the holding member, the housing, the plate-shaped terminals and the flexible circuit board, and consequently an apparatus into which the actuator of the present invention is installed, can be thinner. Further, when molded in metallic molds, the integrated two plate-shaped terminals are employed, and therefore handling of the terminals becomes easier than that of the prior art.

According to the fifth aspect of the present invention, in the actuator as defined in the first aspect, end parts of the two plate-shaped terminals, which end parts are connected to the coil strand, have different shapes, respectively. Therefore, discrimination between the two plate-shaped terminals is easier and an assembly failure of erroneously connecting the terminals and the coil strand can be prevented. In addition, when molded in metallic molds, an erroneous placement of the plate-shaped terminals in the metallic molds is prevented and both plate-shaped terminals can be correctly connected at predetermined positions of the flexible circuit board, whereby a malfunction of the coil moving in an opposite direction can be prevented.

According to the sixth aspect of the present invention, in the actuator as defined in the fifth aspect, one of the end parts of the two plate-shaped terminals, which end parts are connected to the coil strand, is longer than the other. Therefore, discrimination between both plate-shaped terminals is easier, and an assembly failure of erroneously connecting the terminals and the coil strand can be prevented. In addition, when molded in the metallic molds, an erroneous placement of the plate-shaped terminals in the metallic molds is prevented and both plate-shaped terminals can be correctly connected at predetermined positions of the flexible circuit board, whereby a malfunction of the coil moving in an opposite direction can be prevented.

According to the seventh aspect of the present invention, in the actuator as defined in the fifth aspect, one of the end parts of the two plate-shaped terminals, which end parts are connected to the coil strand, is crank-shaped. Therefore, discrimination between both plate-shaped terminals is easier, and an assembly failure of erroneously connecting the terminals and the coil strand can be prevented. In addition, when molded in the metallic molds, an erroneous placement of the plate-shaped terminal in the metallic molds is prevented and both plate-shaped terminals can be correctly connected at predetermined positions of the flexible circuit board, and a malfunction of the coil moving in an opposite direction can be prevented.

DETAILED DESCRIPTION OF THE PREFERRED EMBODIMENTS (Embodiment 1)

Hereinafter, an actuator according to a first embodiment of the present invention will be described.

Figure 1:
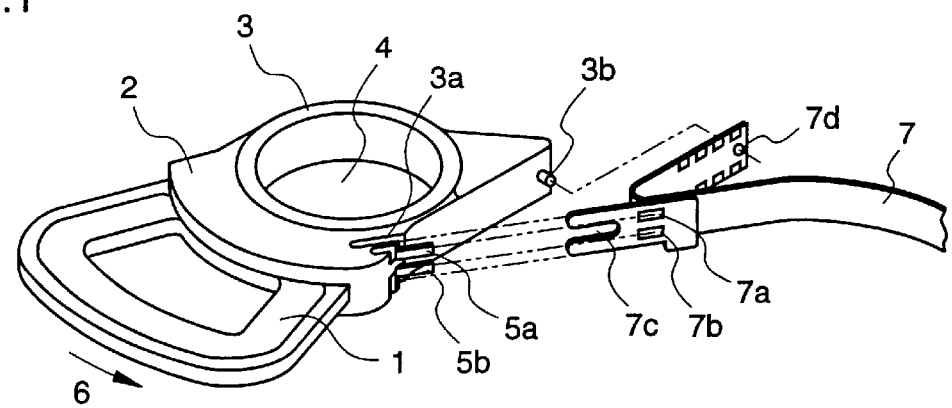
FIG. 1 is a perspective view for illustrating a structure of a movable part of an actuator according to a first embodiment of the present invention.
Figure 2:
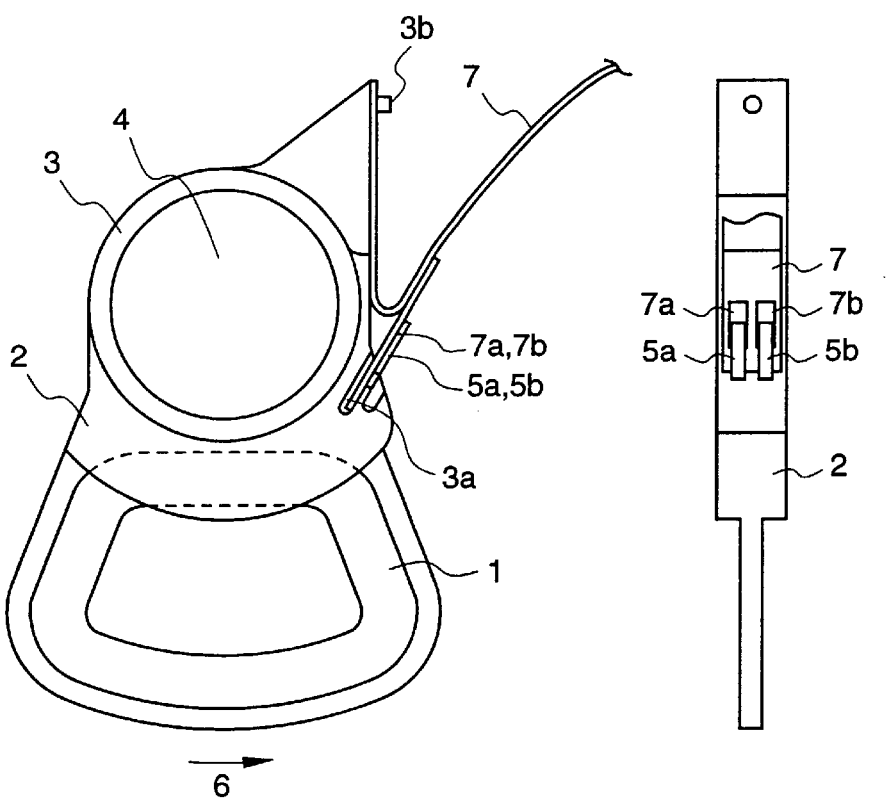
FIG. 2 is a plan view for illustrating a structure of the movable part according to the first embodiment of the present invention.

FIGS. 1 and 2 are diagrams for illustrating a structure of a movable part of the actuator according to the present invention, wherein FIG. 1 is a perspective view and FIG. 2 is a plan view.

In these figures, numeral 1 denotes a coil and numeral 2 denotes a holding member for holding the coil 1, which is made of a thermoplastic resin. Numeral 3 denotes a housing made of a metal material such as aluminum alloy or thermoplastic resin, and a rotation constraint mechanism and a magnetic head can be fitted in a hole 4 provided in the housing 3 (the rotation constraint mechanism and the magnetic head are not shown). Numerals 5a and 5b denote plate-shaped terminals to which opposite end parts of a strand of the coil 1 are electrically connected, respectively, and numeral 7 denotes a flexible circuit board comprising a conductor part which transmits a current from a current generation source (not shown) to the coil 1 via the plate-shaped terminals 5a and 5b. As characteristics of this first embodiment, the two plate-shaped terminals 5a and 5b are provided on a side of the holding member 2 in the same direction as a coil moving direction 6, and the two plate-shaped terminals 5a and 5b are arranged so as to be flush with each other.

The movable part is sandwiched by plural yokes and a permanent magnet (not shown) which is attached to one of the yokes, like with the conventional structure.

The coil 1 is wound in a shape of a trapezoid, and when a current in a clockwise direction is passed through the coil 1, a force is generated in coil 1 in accordance with Fleming's left hand rule and the coil 1 moves in the direction shown by arrow 6. When a current in a counterclockwise direction is passed through the coil 1, the coil 1 moves in an opposite direction to that of arrow 6. The coil 1 is set by a stopper (not shown) to be able to move only within a coil moving range.

Next, a manufacturing method of the movable part according to the first embodiment of the present invention will be described with reference to FIGS. 1 to 4.

Figure 3:
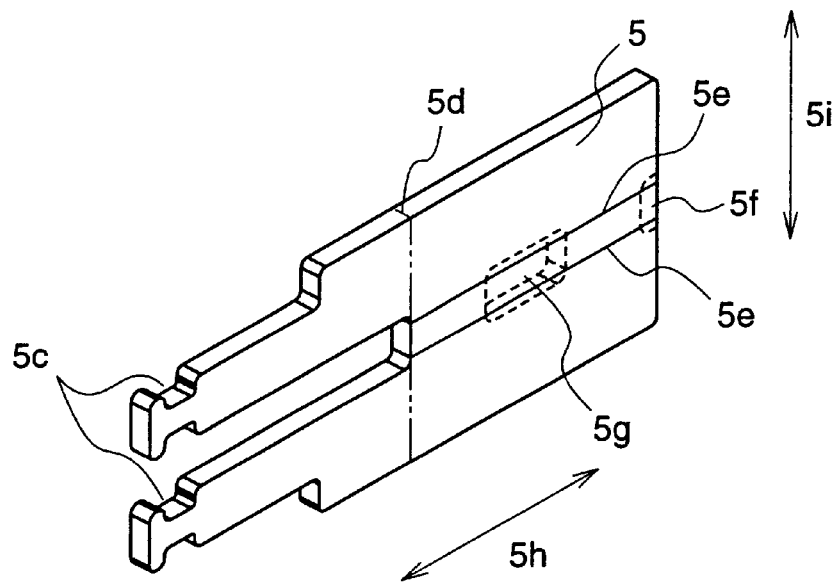
FIG. 3 is an enlarged perspective view for illustrating a structure of a plate-shaped terminal in the movable part according to the first embodiment of the present invention.
Figure 4:
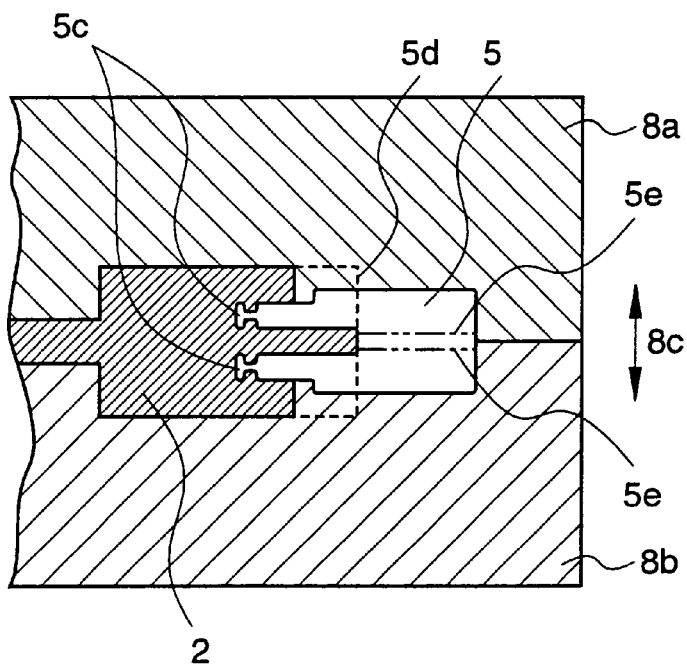
FIG. 4 is a partial sectional view of metallic molds for forming the movable part according to the first embodiment of the present invention.

FIG. 3 is an enlarged perspective view for illustrating structures of plate-shaped terminals in the actuator movable part, and FIG. 4 is a sectional view of metallic molds for forming the movable part. Further, for the same components as those in FIGS. 1 and 2, the same reference numerals are used and descriptions thereof will not be given.

In FIG. 3, terminal 5 is plate-shaped. One end of the plate-shaped terminal 5 is in one piece, and another end is forked. Constricted parts 5c of two end parts of the plate-shaped terminal are wound by opposite ends of coil strand 1, respectively, and electrically connected thereto with solder. Numerals 5h and 5i denote a longitudinal direction and a transverse direction of the plate-shaped terminal 5, respectively.

In FIG. 4, numerals 8a and 8b denote upper and lower metallic molds, respectively, and numeral 8c denotes a separation direction of the upper and lower metallic molds 8a and 8b. The separation direction 8c is set to be a direction perpendicular to the coil moving direction 6 because the coil 1 is of flat type and this direction is convenient for positioning the coil 1 in the metallic molds 8a and 8b.

The plate-shaped terminal 5 is a terminal that has characteristics of the present invention, and since it is plate-shaped, both of the longitudinal direction 5h and the transverse direction 5i of the plate-shaped terminal 5 can be arranged parallel with the coil moving direction 6 in metallic molds 8a and 8b, and the plate-shaped terminal 5 can be placed on any of top, bottom and side surfaces of holding member 2. In this case, the separation direction 8c is perpendicular to the coil moving direction 6. However, even when metallic molds having other separation directions are employed, the plate-shaped terminal 5 can be placed similarly on any of the top, bottom, and side surfaces of the holding member 2.

According to the manufacturing method of the movable part of the present invention, initially, the coil 1, the housing 3 and the plate-shaped terminal 5 connected to the coil 1 are placed in the metallic molds 8a and 8b, and thermoplastic resin is injected into the metallic molds 8a and 8b, thereby forming the holding member 2, and integrating the coil 1, the holding member 2, the housing 3 and the plate-shaped terminal 5. According to this embodiment, a position of the plate-shaped terminal 5 is a position that has characteristics of the present invention and, when the plate-shaped terminal 5 is positioned in the metallic molds 8a and 8b, the longitudinal direction 5h of the plate-shaped terminal 5 is directed in the coil moving direction 6.

After the resin is molded, a portion of the plate-shaped terminal 5 from a dash-double-dot line 5d toward the forked end parts is held by the holding member 2, and an integral side is exposed. A cut-off part 5e surrounded by a dash-double-dot line is removed from an exposed part of the plate-shaped terminal 5, thereby forming two plate-shaped terminals 5a and 5b.

When two terminals of the same shape are separated, because of structures of the metallic molds 8a and 8b, the two separated plate-shaped terminals 5a and 5b cannot be provided on a flat surface on a side of the holding member 2 as shown in FIG. 1. However, like in this embodiment, when one plate-shaped terminal 5 is placed in the metallic molds 8a and 8b as shown in FIG. 4 and molded with a resin, and thereafter cut-off part 5e of the plate-shaped terminal 5 is removed, the above-mentioned construction can be easily realized. In addition, one terminal is very small, and therefore handling becomes easier than that of the prior art by using a terminal in which two plate-shaped terminals 5a and 5b have been previously integrated.

In addition, as shown in FIG. 3, in the cut-off part 5e of the plate-shaped terminal 5, an indented part 5f or a hole 5g as shown by broken lines can be provided. Thereby, the plate-shaped terminal 5 can be easily separated into two.

Next, as shown in FIG. 1, the flexible circuit board 7 is attached to the holding member 2. A U-shaped end part 7c of the flexible circuit board 7 is inserted into a slot or groove 3a of the holding member 2, and a projection 3b provided on the housing 3 is inserted into a hole 7d. The plate-shaped terminals 5a and 5b are brought into surface contact with connecting parts 7a and 7b provided at a conductor part of the flexible circuit board 7, and these contacted sections are electrically connected to each other with solder (not shown).

As described above, the plate-shaped terminals 5a and 5b provided on the side of the holding member 2 so as to be flush are brought into surface-contact with the connecting parts 7a and 7b included in the flexible circuit board 7, and soldered. Therefore, a thinner movable part can be realized and, as a result, an apparatus into which an actuator in its entirety is installed is thinner. Further, miniaturization of connecting parts of the flexible circuit board 7 and the plate-shaped terminals 5a and 5b can enlarge adjacent yokes or a permanent magnet, whereby a large torque can be obtained.

(Embodiment 2)

Plate-shaped terminals in a movable part of an actuator according to a second embodiment of the present invention will be described with reference to FIGS. 5 and 6. Here, as for parts of a structure and a manufacturing method of the actuator, which are common to those of the first embodiment, description will not be given.

Figure 5:
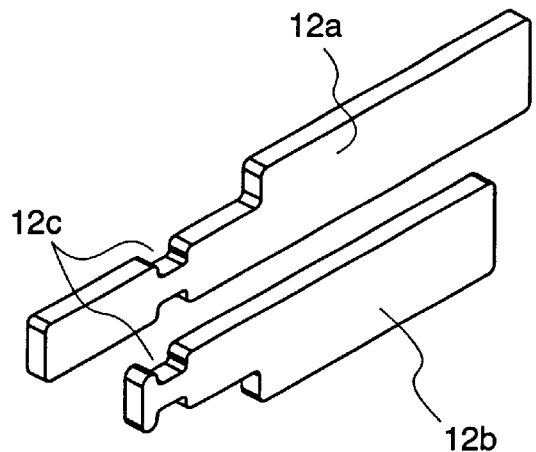
FIG. 5 is an enlarged perspective view for illustrating structures of plate-shaped terminals in a movable part of an actuator according to a second embodiment of the present invention.

FIG. 5 is an enlarged perspective view for illustrating an example of structures of plate-shaped terminals in the movable part of the second embodiment.

In this figure, plate-shaped terminals 12a and 12b are terminals which have characteristics of the present invention, and lengths of end parts of one terminal are longer than those of the other. Constricted parts 12c in the end parts of these plate-shaped terminals 12a and 12b are wound by opposite ends of a coil strand, respectively, and electrically connected thereto with solder. At this time, the lengths of the end parts of the two plate-shaped terminals 12a and 12b are different, and therefore discrimination between the plate-shaped terminals 12a and 12b is easier, and an assembly failure of improperly connecting the connecting terminals and ends of the coil strand 1 can be prevented. In addition, when the plate-shaped terminals 12a and 12b are positioned in metallic molds, erroneous positioning of both plate-shaped terminals 12a and 12b is prevented, both plate-shaped terminals 12a and 12b can be correctly connected to predetermined connecting parts 7a and 7b of flexible circuit board 7, and a malfunction in that a moving direction of coil 1 becomes opposite can be prevented.

Figure 6:
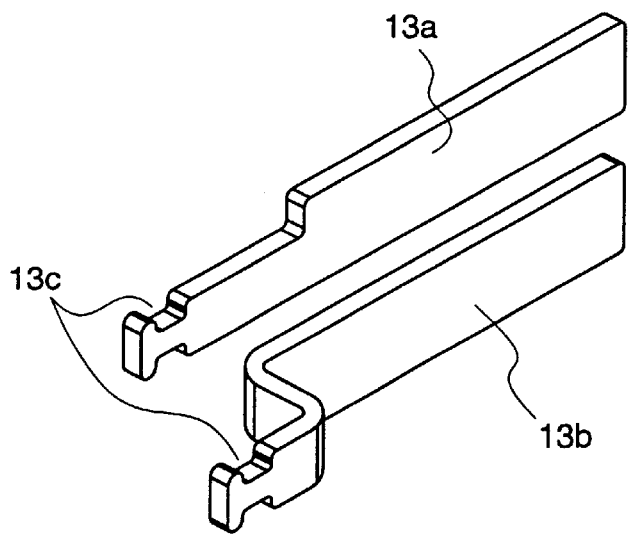
FIG. 6 is an enlarged perspective view for illustrating other structures of plate-shaped terminals in the movable part according to the second embodiment of the present invention.
Figure 7:
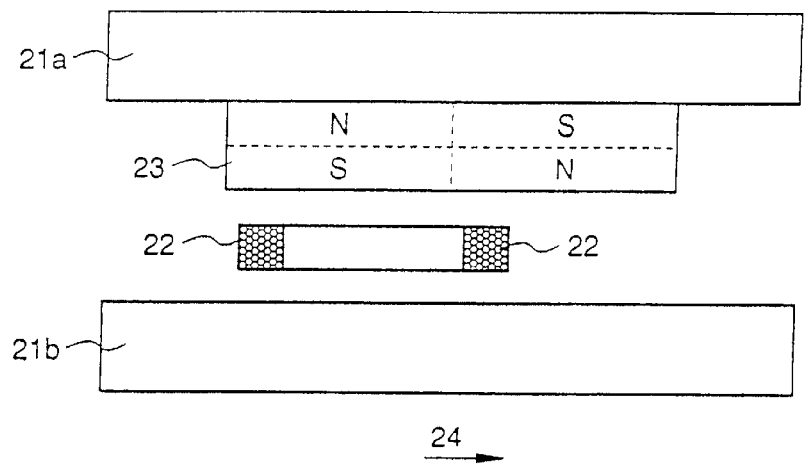
FIG. 7 is a sectional view illustrating a conventional actuator.
Figure 8:
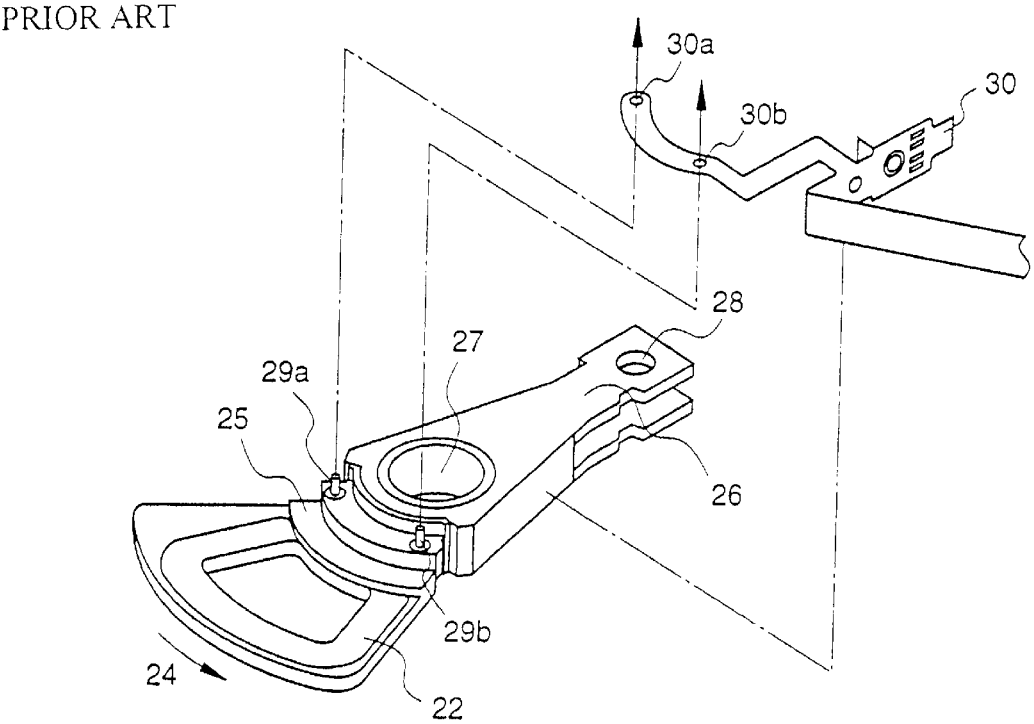
FIG. 8 is a perspective view for illustrating a structure of a conventional actuator movable part.
Figure 9:
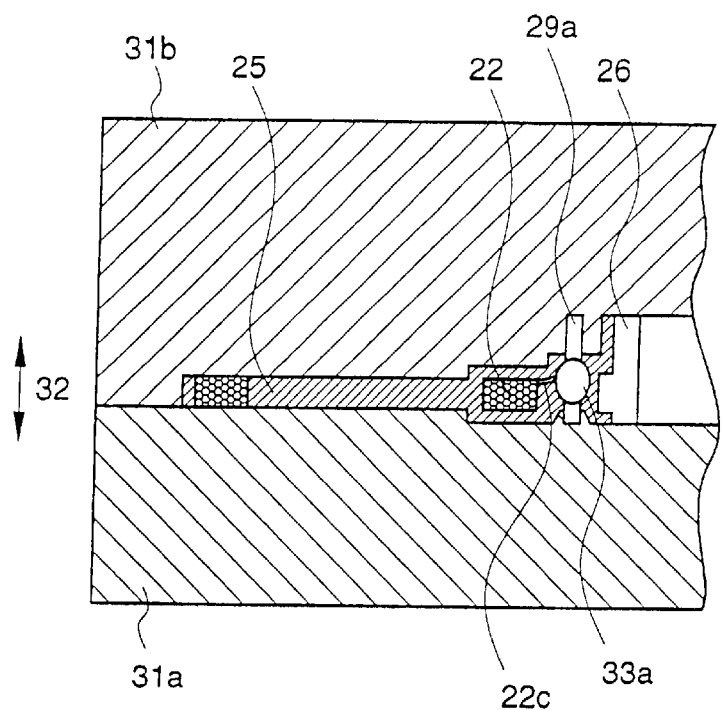
FIG. 9 is a sectional view illustrating metallic molds for forming the conventional actuator movable part.
Figure 10:
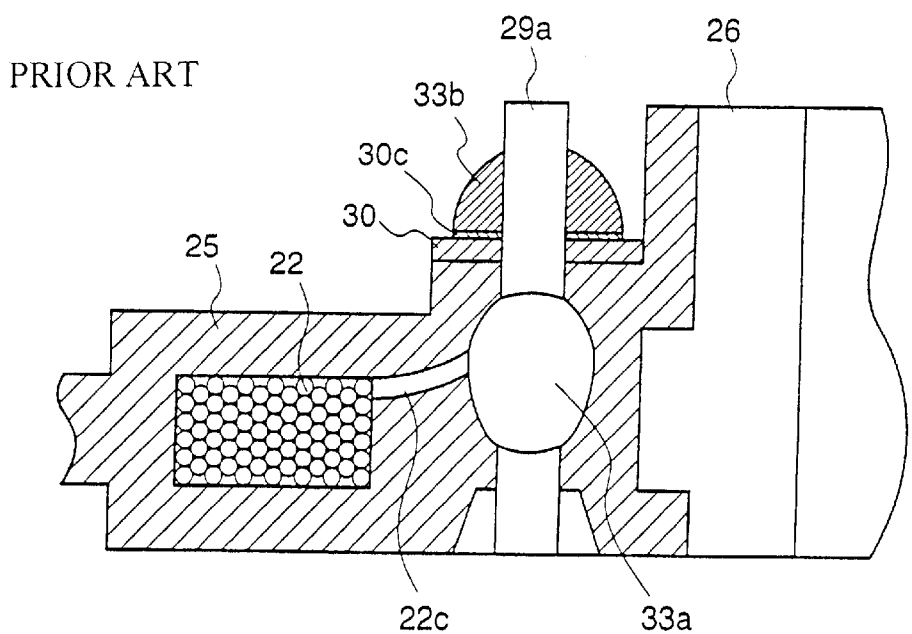
FIG. 10 is an enlarged view of a connecting part between pin-shaped terminals and a flexible circuit board in the conventional actuator movable part.

FIG. 6 is an enlarged perspective view for illustrating another example of structures of plate-shaped terminals in the movable part of the present invention.

In this figure, plate-shaped terminals 13a and 13b are terminals which have characteristics of the present invention, and one end part thereof is crank-shaped, i.e. it has a first portion and a second portion that is laterally offset relative to the first portion. Constricted parts 13c of end parts of the plate-shaped terminals 13a and 13b are wound by opposite ends of coil strand 1, respectively, and electrically connected thereto with solder. Then, one of the end parts of two plate-shaped terminals 13a and 13b has a shape different from that of the other, and therefore discrimination between the plate-shaped terminals 13a and 13b is easier, whereby an assembly failure of erroneously connecting the terminals and opposite ends of the coil strand 1 can be prevented. In addition, when the plate-shaped terminals 13a and 13b are positioned in metallic molds, an erroneous placement of both plate-shaped terminals 13a and 13b is prevented, and both plate-shaped terminals 13a and 13b can be correctly connected to predetermined connecting parts 7a and 7b of flexible circuit board 7, whereby a malfunction in that the coil 1 moves in an opposite direction can be prevented.

APPLICABILITY IN INDUSTRY

In an actuator which is used for transferring a head of a magnetic disk drive and the like, terminals for applying a current to a coil are plate-shaped and provided on a side of a housing, whereby an apparatus into which an actuator is installed is thinner. Additionally, shapes of the plate-shaped terminals can be different, whereby generation of defects due to erroneous wiring at manufacturing actuators can be prevented.

What is claimed is:

1. An actuator comprising:

yokes confronting one another and defining a predetermined space therebetween;

a movable coil between said yokes;

a permanent magnet between said yokes and attached to at least one of said yokes, said permanent magnet for applying a magnetic field to said movable coil;

a holding member for holding said movable coil, said holding member having a groove therein;

a housing having a first end to which said holding member is attached, and also having a second end to which a functional member can be attached;

a flexible circuit board for transmitting a current to said movable coil; and two terminals having end parts to which ends of a strand forming said movable coil are electrically connected, respectively, within said holding member;

wherein said groove is constructed and arranged to receive said flexible circuit board such that when said flexible circuit board is inserted into said groove said two terminals become electrically connected to said flexible circuit board.

2. The actuator according to claim 1, wherein said holding member comprises a thermoplastic resin holding member.

3. The actuator according to claim 2, wherein said two terminals comprise two plate-shaped terminals.

4. The actuator according to claim 3, wherein said two plate-shaped terminals are formed by molding thermoplastic resin, which is to form said holding member, around a unitary piece and then separating said unitary piece into two pieces, with each of said two pieces corresponding to a respective one of said two plate-shaped terminals.

5. The actuator according to claim 3, wherein said end parts of said two terminals have different shapes relative to one another.

6. The actuator according to claim 5, wherein one of said end parts is longer than another of said end parts.

7. The actuator according to claim 5, wherein one of said end parts includes a first portion, and a second portion that is laterally offset relative to said first portion.

8. The actuator according to claim 1, wherein said two terminals are soldered to respective connecting parts of said flexible circuit board.

9. The actuator according to claim 1, further comprising:

a projection extending from said housing, wherein said flexible circuit board has a hole to receive said projection such that said flexible circuit board becomes positioned relative to said housing.

10. The actuator according to claim 9, wherein said holding member comprises a thermoplastic resin holding member.

11. The actuator according to claim 10, wherein said two terminals comprise two plate-shaped terminals.

12. The actuator according to claim 11, wherein said two plate-shaped terminals are formed by molding thermoplastic resin, which is to form said holding member, around a unitary piece and then separating said unitary piece into two pieces, with each of said two pieces corresponding to a respective one of said two plate-shaped terminals.

13. The actuator according to claim 11, wherein said end parts of said two terminals have different shapes relative to one another.

14. The actuator according to claim 13, wherein one of said end parts is longer than another of said end parts.

15. The actuator according to claim 13, wherein one of said end parts includes a first portion, and a second portion that is laterally offset relative to said first portion.

16. The actuator according to claim 9, wherein said two terminals are soldered to respective connecting parts of said flexible circuit board.

17. The actuator according to claim 9, wherein said two terminals comprise two plate-shaped terminals.

18. The actuator according to claim 17, wherein said end parts of said two terminals have different shapes relative to one another.

19. The actuator according to claim 1, wherein said two terminals comprise two plate-shaped terminals.

20. The actuator according to claim 19, wherein said end parts of said two terminals have different shapes relative to one another.

* * * * *